United States Patent
Prakash

(10) Patent No.: US 7,454,068 B2
(45) Date of Patent: Nov. 18, 2008

(54) SYSTEM AND METHOD FOR PROVIDING BLACK WHITE IMAGE COMPRESSION

(75) Inventor: Ravinder Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 10/706,584

(22) Filed: Nov. 12, 2003

(65) Prior Publication Data

US 2005/0100225 A1    May 12, 2005

(51) Int. Cl.
    G06K 9/36    (2006.01)
(52) U.S. Cl. .............. 382/232; 382/233; 382/247; 382/240; 382/251; 382/298; 358/426.01
(58) Field of Classification Search .............. 382/232, 382/233, 246, 247, 251, 240; 358/1.2, 426.01
See application file for complete search history.

(56) References Cited

U.S. PATENT DOCUMENTS

| | | | |
|---|---|---|---|
| 3,976,982 A | | 8/1976 | Eiselen |
| 4,725,885 A | * | 2/1988 | Gonzales et al. ....... 375/240.14 |
| 5,109,438 A | | 4/1992 | Alves et al. |
| 5,404,411 A | * | 4/1995 | Banton et al. ............... 382/254 |
| 5,414,469 A | | 5/1995 | Gonzales et al. |
| 5,949,919 A | | 9/1999 | Chen |
| 5,982,937 A | | 11/1999 | Accad |
| 6,185,328 B1 | | 2/2001 | Shiau |
| 6,493,041 B1 | | 12/2002 | Hanko et al. |
| 6,608,915 B2 | | 8/2003 | Tsujii |
| 2002/0005857 A1 | * | 1/2002 | Kasahara et al. ............. 345/611 |
| 2005/0018917 A1 | * | 1/2005 | Brothers ..................... 382/243 |
| 2005/0069217 A1 | * | 3/2005 | Mukherjee .................. 382/266 |
| 2005/0135700 A1 | * | 6/2005 | Anderson .................... 382/261 |

FOREIGN PATENT DOCUMENTS

| | | |
|---|---|---|
| EP | 0 539 833 A2 | 5/1993 |
| JP | 63090962 | 4/1988 |
| JP | 06078136 | 3/1994 |
| JP | 10108007 | 4/1998 |
| JP | 20022354233 | 12/2002 |

OTHER PUBLICATIONS

United States Defensive Publication, No. T985,005, Aug. 7, 1979, Goertzel et al., 24 pages.
Fernando, et al., "A Unified Approach to Scene Change Detection in Uncompressed and Compressed Video," IEEE Transactions on Consumer Electronics Conference, vol. 46, No. 3, pp. 350-351, Aug. 2000 A.B.

* cited by examiner

*Primary Examiner*—Matthew C. Bella
*Assistant Examiner*—Ali Bayat
(74) *Attorney, Agent, or Firm*—Douglas A. Lashmit; Hoffman Warnick LLC

(57) ABSTRACT

A compression system and method for compressing a bitonal image. A system is disclosed that comprises: a scaling system for geometrically scaling the bitonal image such that transition and isolated attributes are preserved, wherein the scaling system reduces contiguous sets of original pixels down to fewer scaled pixels; and an encoding system that encodes the scaled bitonal image using an industry standard format.

7 Claims, 2 Drawing Sheets

| Index number | Input * | Output ** |
|---|---|---|
| 00 | 0 00 0 | 0 |
| 01 | 0 00 1 | 0 |
| 02 | 0 01 0 | 1 |
| 03 | 0 01 1 | 1 |
| 04 | 0 10 0 | 1 |
| 05 | 0 10 1 | 1 |
| 06 | 0 11 0 | 1 |
| 07 | 0 11 1 | 1 |
| 08 | 1 00 0 | 0 |
| 09 | 1 00 1 | 0 |
| 10 | 1 01 0 | 0 |
| 11 | 1 01 1 | 0 |
| 12 | 1 10 0 | 0 |
| 13 | 1 10 1 | 0 |
| 14 | 1 11 0 | 1 |
| 15 | 1 11 1 | 1 |

SYSTEM AND METHOD FOR PROVIDING BLACK WHITE IMAGE COMPRESSION

BACKGROUND OF THE INVENTION

1. Technical Field

The present invention relates generally to image compression, and more specifically relates to a system and method for providing black white image data compression.

2. Related Art

Since the advent of the modern information technology age, systems have been developed to store, process, or communicate black white image data retrieved from printed documents. Common examples include, for instance, facsimile machines, copiers, scanners, etc. In many instances, the system is required to archive, store or transmit the black and white image data. To improve performance, the image data is compressed, thereby reducing storage, processing and bandwidth requirements.

Black white image data compression techniques are well known in the art. Due to the universal need for encoding and decoding (namely compression and decompression) of image data, the industry has adopted standards, which are widely used today. CCITT-G4, for example, is one of the most popular standards, finding its most extensive use in facsimile machines. Typical compression ratios using CCITT-G4 are on the order of 10-15×. Ultimately, the amount of compression is a function of the black white image information/data content.

In the case of most black white compression standards, such as CCITT-G4, the compression process, which is engineered to be an encoding process, is lossless, i.e., following the decompression process, all information present in the original image is fully recovered. Thus, limitations exist with respect to the amount of compression that can be achieved.

However, numerous present day industries are increasingly required to archive vast amounts of information in electronic form. Examples include the finance industry saving check images, the insurance industry saving documents, the health care industry saving medical records, the legal industry, federal and state governments, etc. Accordingly, data compression for black white images remains of vital interest.

SUMMARY OF THE INVENTION

The present invention addresses the above-mentioned problems by providing a methodology to obtain improved bitonal (e.g., black white) image compression, while maintaining compatibility with industry standard encoding and decoding techniques. In a first aspect, the invention provides a compression system for compressing a bitonal image, comprising: a scaling system for geometrically scaling the bitonal image, wherein the scaling system reduces contiguous sets of original pixels down to a smaller set of scaled pixels; and an encoding system that encodes the scaled bitonal image using an industry standard technique.

In a second aspect, the invention provides a method for compressing a bitonal image, comprising: geometrically scaling the bitonal image; and encoding the scaled bitonal image using an industry standard technique.

In a third aspect, the invention provides a program product stored on a recordable medium for processing a bitonal image, comprising a scaling system having: means for selecting a pair of pixels from the original bitonal image; means for forming a four digit binary value made up of values from the pair of pixels and two flanking pixels; means for calculating a single binary pixel value from the four digit binary value; and means for generating a scaled bitonal image in which the pair of pixels is replaced with the single binary pixel value.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

The present invention provides a methodology for compressing images, beyond the capabilities of standardized encoding technologies, such as that provided by CCITT-G4. While the embodiments described herein are described with reference to black white images, it should be recognized that the scope of the invention may be applied any type of bitonal image. Moreover, while the invention is described with reference to a CCITT-G4 encoding system, it is understood that any known bitonal encoding technique could be utilized. Examples include ABIC, JBIG, etc.

The present invention recognizes that two attributes of a bitonal (e.g., black white) image are responsible for making the image legible and readable. The first important attribute involves transitions. As a black white image is scanned (similar in manner as a CRT scans a screen), one notices the presence of transitions, both from white to black and black to white. It is this aspect that gives the image contrast, readily noticed by the human eye. When properly placed transitions occur on multiple scan lines, legible and readable information begins to appear.

The second important attribute involves the very small (i.e., single) isolated features, namely, single black pixels between white pixels or single white pixels between black pixels. These isolated features provide richness and sharpness to an image. As long as the scaling system is able to preserve these two attributes, and substantially maintain their relative geographic locations, a transformed image will offer near identical informational content.

Typical black white images (such as checks and other printed documents) have approximately 10% of their pixel space represented by black pixels. Since many of these black pixels will invariably be clustered together, a few transition points (relative to the entire pixel space) will be encountered when the image is scanned. Similarly, a typical black white image will also contain occasional isolated features. For example, there may be areas contained in the image where a single black pixel is sandwiched between white pixels, or where a single white pixel is sandwiched between black pixels.

A fundamental feature of the invention is to geometrically scale (referred to herein as "smartscaling") the image to reduce the pixel count while maintaining the two aforementioned attributes. In the exemplary embodiment described below, the pixel count is reduced by 2× in both the X and Y direction. However, it should be understood that any pixel reduction that maintains the two attributes could be utilized. Accordingly, smartscaling refers to any bitonal pixel reduction in which transition and isolated attributes are preserved, and the attributes' relative geographic positions are substantially maintained.

Figure 1:
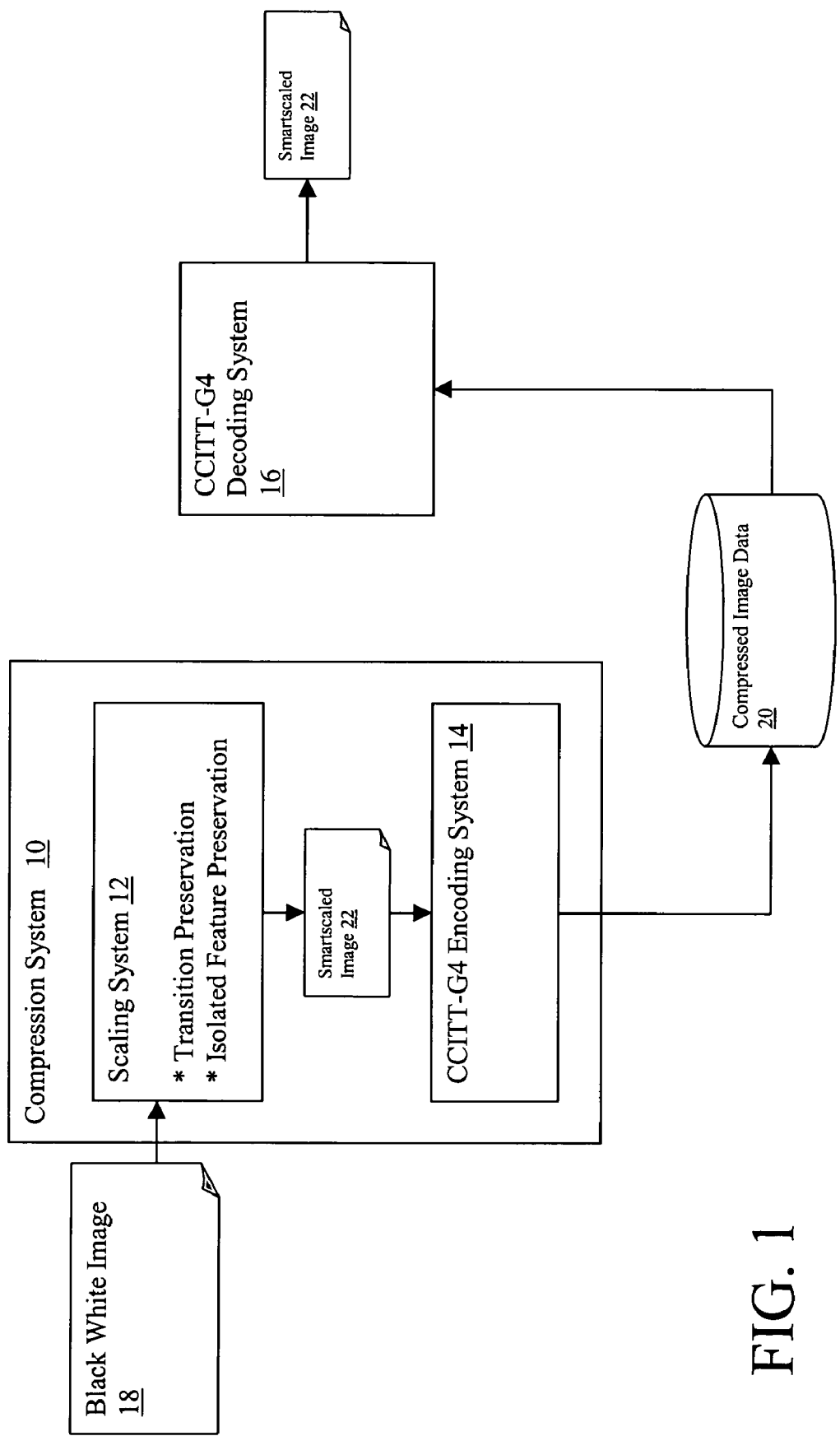
FIG. 1 depicts a bitonal compression system in accordance with the present invention.

Referring now to FIG. 1, a compression system 10 is shown that receives a black white image 18 and outputs compressed image data 20, which can be, e.g., archived, transmitted, processed, etc. The black white image 18 is first submitted to scaling system 12. Scaling system 12 "smartscales" the image, resulting in a pixel reduction in which transition and isolated attributes are preserved, and the attributes' relative geographic positions are substantially maintained. Although not required, other filtering and processing operations could also be applied to further improve the quality of the smart-scaled image 22. The smartscaled image 22 is then submitted to a CCITT-G4 encoding system 14, which performs an industry standard encoding operation (commonly used in facsimile operations and the like). Note that other industry standard encoding system could likewise be used.

Once encoded, the smartscaled image 22 can be retrieved by decoding the compressed image data 20 with an industry standard CCITT-G4 decoder. The scaled black white image can then be manipulated as needed (e.g., displaying, printing, zooming, expanding) using know techniques and systems with aliasing corrections.

Using the compression system 10 described above, a size reduction of about 45% can be achieved over the compression achieved by a stand-alone CCITT-G4 encoding system 14. Note that a smartscaled image 22 may have limited, localized, geometric distortion. For instance, a single pixel may sometimes be displaced by one pixel position. However, this distortion is only evident when viewed under high magnification. Accordingly, for most all applications (such as E13B OCR readability), any distortion will not diminish or affect the information content being presented in the image.

Figures 2, 3:
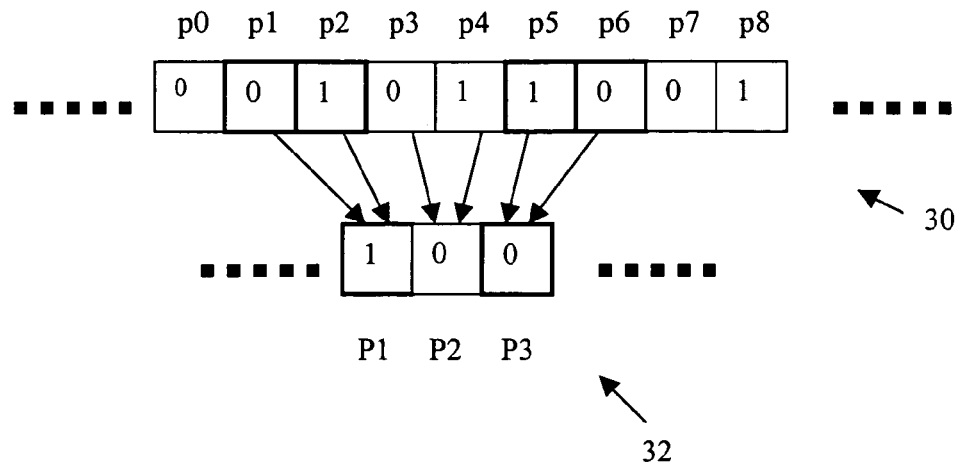
FIG. 2 depicts a scaling operation in accordance with the present invention.
FIG. 3 depicts a table used in the scaling operation depicted in FIG. 2.

As noted above, scaling system 12 provides a pixel reduction in which transition and isolated attributes are preserved, and the attributes' approximate relative geographic positions are substantially maintained. FIGS. 2-3 depict an exemplary smartscaling embodiment in which the number of pixels is reduced by a factor of two. Specifically, as shown in FIG. 2, a first partial row 30 of pixels p0, p1 . . . p8 are shown prior to scaling, and a second partial row 32 of pixels P1, P2, P3, are shown after scaling. Each pixel of the black white (or any bitonal) image has a value of either 1 or 0, where for example 1 represents white and 0 represents black. In this example, pixels p1-p6 are scaled down to P1-P3, i.e., contiguous sets of pixel pairs p1-p2, p3-p4, and p5-p6 are scaled to P1, P2, and P3, respectively.

In an exemplary embodiment, scaling is achieved using an algorithm involving the table shown in FIG. 3. Specifically, when reducing two original pixels down to one scaled pixel, the algorithm must decide whether to assign the scaled pixel a value of 1 or 0. The algorithm decides this by examining the two original pixels and the two flanking pixels that neighbor the two original pixels. Accordingly, when scaling pixels p1 and p2, the algorithm examines pixel values for p0, p1, p2 and p3, in this case 0010. The four values provide the input into the table shown in FIG. 3. In this case, the input 0010 refers to index number 02, and yields an output value of 1. Accordingly, the scaled value for the original pixel pair p1, p2 is 1.

Similarly, the scaled value P2 for the original pixel pair p3, p4 is determined by examining the four values of pixels p2-p5 (i.e., 1011). In this case, the input 1011 refers to index number 11, and yields an output value of 0. The scaled value P3 for the original pixel pair p5, p6 is determined by examining the four values of pixels p4-p7 (i.e., 1100). In this case, the input 1100 refers to index number 12, and also yields an output value of 0.

In the table shown in FIG. 3, four pixels are shown in the input column and the index number is their decimal representation. It is the two central pixels of the input column that are replaced by the output. Output values are determined based on the four digit binary input value such that transition and isolated attributes are preserved in the scaled image, and the attributes' relative geographic positions are substantially maintained. For instance, it can be seen that "0 01 0" has an isolated feature (i.e., a 1 sandwiched between zeros). Accordingly, this results in an output value of 1. The input "1 10 0" has a transition from 1's to 0's. Accordingly, the output value is 0 to ensure that the transition is maintained.

The table depicted in FIG. 3 provides a 2× image reduction. Obviously, various alternative embodiments (e.g., examining a six digit binary input number, providing a 3× image reduction, etc.) could be implemented to achieve similar results. In a typical embodiment, the image may be first scaled in one direction, e.g., horizontally, and then be scaled in the other direction, e.g., vertically.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A method for compressing a bitonal image, comprising:
  geometrically scaling the bitonal image; wherein the step of geometrically scaling the bitonal image comprises:
    selecting a pair of pixels from the original bitonal image;
    forming a four digit binary value made up of values from the pair of pixels and two flanking pixels; calculating a single binary pixel value from the four digit binary value; and replacing the pair of pixels with the single binary pixel value; and
  encoding the scaled bitonal image using an industry standard technique.

2. The method of claim 1, comprising the further steps of:
selecting a second pair of pixels that are contiguous to the first pair of pixels; and
repeating the forming, calculating and replacing steps for the second pair.

3. The method of claim 1, wherein the calculating step is performed with a table look-up.

4. The method of claim 1, wherein the look-up table has 16, four digit binary input values ranging from 0000-1111, and wherein each of the 16 input values equates to a single digit binary output value.

5. The method of claim 1, wherein the bitonal image comprises a black white image.

6. The method of claim 1, wherein the scaling step is optimized to preserve transition and isolated attributes, and substantially maintain relative geographic position of the attributes.

7. The method of claim 1, wherein the predefined protocol comprises CCITT-G4.

* * * * *